(12) United States Patent
Koo

(10) Patent No.: US 11,307,474 B2
(45) Date of Patent: Apr. 19, 2022

(54) ELECTROCHROMIC NANOPARTICLE

(71) Applicant: LG ELECTRONICS INC., Seoul (KR)

(72) Inventor: Sangmo Koo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 457 days.

(21) Appl. No.: 16/077,197

(22) PCT Filed: Mar. 16, 2016

(86) PCT No.: PCT/KR2016/002636
§ 371 (c)(1),
(2) Date: Aug. 10, 2018

(87) PCT Pub. No.: WO2017/155146
PCT Pub. Date: Sep. 14, 2017

(65) Prior Publication Data
US 2020/0089073 A1 Mar. 19, 2020

(30) Foreign Application Priority Data
Mar. 7, 2016 (KR) .................. 10-2016-0027088

(51) Int. Cl.
*G02F 1/1523* (2019.01)
*G02F 1/1524* (2019.01)
*B82Y 20/00* (2011.01)

(52) U.S. Cl.
CPC .......... *G02F 1/1525* (2013.01); *G02F 1/1524* (2019.01); *B82Y 20/00* (2013.01)

(58) Field of Classification Search
CPC .... G02F 1/1514; G02F 1/1525; G02F 1/1524; G02F 1/1503; C09K 9/00; C09K 9/02; B82Y 20/00
See application file for complete search history.

(56) References Cited

U.S. PATENT DOCUMENTS

| 5,413,739 A | 5/1995 | Coleman |
| 2008/0128665 A1 | 6/2008 | Wu et al. |

FOREIGN PATENT DOCUMENTS

| CN | 1738885 A | 2/2006 |
| CN | 103469272 A | 12/2013 |
| CN | 104609705 A | 5/2015 |
| KR | 10-1169922 B1 | 8/2012 |
| KR | 10-2014-0028389 A | 3/2014 |
| KR | 10-2014-0129848 A | 11/2014 |

OTHER PUBLICATIONS

Yang et al., "Preparation and electrochromic property of covalently bonded WO3/polyvinylimidazole core-shell microspheres", Journal of Colloid and Interface Science, vol. 292, 2005 (Available online Sep. 13, 2005), pp. 108-112.

*Primary Examiner* — Jack Dinh
(74) *Attorney, Agent, or Firm* — Birch, Stewart, Kolasch & Birch, LLP

(57) ABSTRACT

The present invention relates to an electrochromic nanoparticle having a core-shell structure. The invention provides an electrochromic nanoparticle comprising: a core formed of a first electrochromic material; and a shell encompassing the core and formed of a second electrochromic material, wherein the first electrochromic material is formed of at least one type of transition metal oxide.

11 Claims, 3 Drawing Sheets

ELECTROCHROMIC NANOPARTICLE

CROSS REFERENCE TO RELATED APPLICATIONS

This application is the National Phase of PCT International Application No. PCT/KR2016/002636, filed on Mar. 16, 2016, which claims priority under 35 U.S.C. 119(a) to Patent Application No. 10-2016-0027088, filed in Republic of Korea on Mar. 7, 2016, all of which are hereby expressly incorporated by reference into the present application.

TECHNICAL FIELD

The present invention relates to an electrochromic nanoparticle having a core-shell structure.

BACKGROUND ART

Electrochromism is a phenomenon in which coloration or decolorization is performed by electrochemical oxidation or reduction reaction depending on the direction of application of electric current. An electrochromic material maintains a predetermined color, and when electric current is applied, the electrochromic material will be discolored to another color. And, when the direction of electric current is reversed, the original color of the electrochromic material is restored.

Here, the absorption spectrum of the electrochromic material is changed by oxidation or reduction reaction. That is, the electrochromic material does not emit light by itself, but takes color through light absorption. Electrochromic devices having such properties have been widely used for uses such as mirrors and sunroofs for vehicles, smart windows, and outdoor displays.

Meanwhile, electrochromic materials are classified into a memory type in which once the discoloration occurs, the discolored state is maintained even though no voltage is applied between an upper electrode and a lower electrode, and a non-memory type in which even though discoloration occurs, the discolored state is maintained only when voltage is continuously applied between the upper electrode and the lower electrode.

The memory type has a very high utilization value because the power consumption for the material discoloration is not high. Thus, various studies for utilizing the memory type electrochromic material have been conducted.

However, an electrochromic matter in the related art has disadvantages in that it is difficult to implement various colors, and it is difficult to implement high light-shielding properties because only one material takes part in discoloration. Further, the electrochromic matter in the related art has a disadvantage in that it is difficult to simultaneously implement a high discoloration rate and high light-shielding properties.

DISCLOSURE OF THE INVENTION

Therefore, an object of the present invention is to provide an electrochromic nanoparticle having both a high discoloration rate and high light-shielding properties.

Further, another object of the present invention is to provide an electrochromic nanoparticle capable of implementing various colors.

To achieve these and other advantages and in accordance with the purpose of the present invention, as embodied and broadly described herein, there is provided an electrochromic nanoparticle including: a core formed of a first electrochromic material; and a shell encompassing the core and formed of a second electrochromic material, wherein the first electrochromic material is formed of at least one type of transition metal oxide.

In an Example, the core and the shell may display complementary colors with respect to each other. Through this, the electrochromic nanoparticle according to the present invention may absorb all light in the visible light region band.

In an Example, the core and the shell may display similar colors. Through this, the electrochromic nanoparticle according the present invention may strongly display a color to be implemented.

In an Example, the second electrochromic material may be formed of an organic material. Through this, the present invention may provide an electrochromic nanoparticle capable of having both a high electrochromic rate and simultaneously implementing various colors.

In an Example, the second electrochromic material may be formed of an inorganic material. Through this, the present invention may provide an electrochromic nanoparticle capable of having chemical stability and simultaneously implementing various colors.

In an Example, it is possible to further include an adsorption layer formed so as to enhance adsorption force of the core and the shell between the core and the shell. Through this, the present invention may provide an electrochromic nanoparticle having a high structural stability.

According to the present invention, it is possible to provide an electrochromic matter having both high light-shielding properties and a high discoloration rate.

Further, according to the present invention, it is possible to provide an electrochromic matter having a high chemical stability.

In addition, according to the present invention, it is possible to implement an electrochromic device which displays various colors caused by a color combination of the core and the shell.

MODES FOR CARRYING OUT THE PREFERRED EMBODIMENTS

Figure 1:
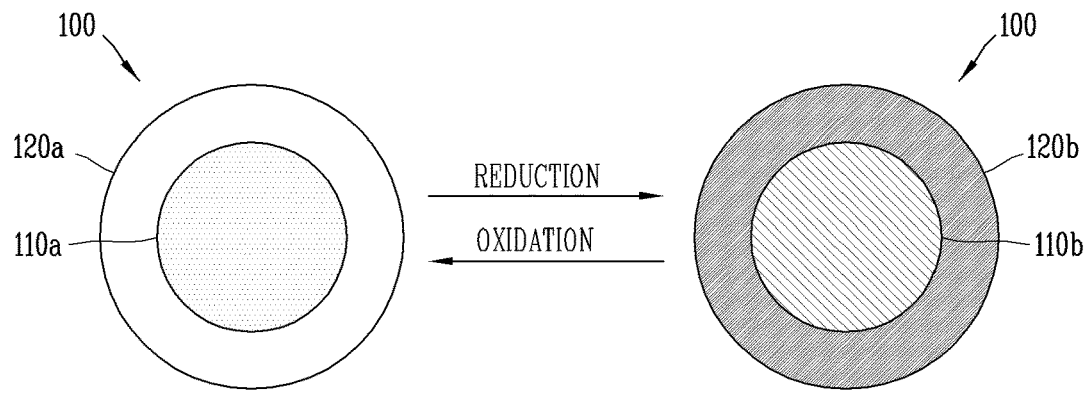
FIG. 1 is a conceptual view illustrating an electrochromic nanoparticle according to the present invention.

Reference will now be made in detail to the preferred embodiments of the present invention, examples of which are illustrated in the accompanying drawings. It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

Description will now be given in detail of a drain device and a refrigerator having the same according to an embodiment, with reference to the accompanying drawings.

Hereinafter, examples disclosed in the present specification will be described in detail with reference to the accompanying drawings, the same reference numerals are given to the same or similar constituent elements irrespective of the drawing signs, and the repeated description thereof will be omitted. When it is determined that the detailed description of the publicly known art related in describing the Examples disclosed in the present specification may obscure the gist of the Examples disclosed in the present specification, the detailed description thereof will be omitted. In addition, the accompanying drawings are provided to easily understand the examples disclosed in the present specification, and it is to be appreciated that the technical spirit disclosed in the present specification is not limited by the accompanying drawings, and the accompanying drawings include all the modifications, equivalents, and substitutions included in the spirit and the technical scope of the present invention.

An electrochromic nanoparticle according to the present invention has a core-shell structure. Hereinafter, a core and a shell of a nanoparticle according to the present invention will be described in detail.

FIG. 1 is a conceptual view illustrating an electrochromic nanoparticle according to the present invention.

A core and a shell of a nanoparticle 100 according to the present invention are formed of different types of electrochromic materials. That is, in the nanoparticle according to the present invention, both the core and the shell have electrochromic ability, and the core and the shell have different absorption spectra.

Specifically, as in FIG. 1, a core 110a and a shell 120a, which constitute the nanoparticle 100 according to the present invention, are discolored 110b and 120b depending on oxidation or reduction reaction.

Hereinafter, an electrochromic material constituting the core is defined as a first electrochromic material, and an electrochromic material constituting the shell is defined as a second electrochromic material.

When a voltage equal to or more than a reference value is applied to the nanoparticle 100 according to the present invention, the nanoparticle 100 is converted from a first state to a second state. Here, the first state means a state before the first and second electrochromic materials are discolored. Further, the second state means a state in which both the first and second electrochromic materials are discolored.

Meanwhile, the reference value means a voltage value capable of oxidizing or reducing both the first and second electrochromic materials.

Meanwhile, for the nanoparticle 100 according to the present invention, when a reverse voltage equal to or more than the reference value is applied to the nanoparticle in the second state, the nanoparticle is converted from the second state to the first state.

When the nanoparticle 100 according to the present invention is utilized as an electrochromic matter, high light-shielding properties may be implemented. Specifically, the nanoparticle 100 has different light transmittances in the first and second states. Since each material constituting a core and a shell has different absorption spectra, the nanoparticle has relatively a broad absorption spectrum when compared with one material.

For example, the first electrochromic material may be colorless in an oxidation state, and may have a first color in a reduction state. Further, the second electrochromic material may be colorless in an oxidation state, and may have a second color that is a complementary color of the first color. When the first and second electrochromic materials are converted from the oxidation state to the reduction state by applying voltage to the nanoparticle 100, the nanoparticle absorbs all light in the visible light region. That is, the nanoparticle displays a black-based color.

Specifically, when the nanoparticle 100 is converted from the first state to the second state, in the case where the transmittance at each wavelength within a wavelength band of 400 nm to 800 nm corresponding to the visible light region is reduced by a large margin, the nanoparticle displays a black-based color.

For another example, the first electrochromic material may be colorless in an oxidation state, and may have a blue color in a reduction state. Further, the second electrochromic material may be colorless in an oxidation state, and may have a blue color that is similar to that of the first electrochromic material in a reduction state. When the first and second electrochromic materials are converted from the oxidation state to the reduction state by applying voltage to the nanoparticle 100, the nanoparticle strongly displays a blue-based color.

Specifically, when the nanoparticle 100 is converted from the first state to the second state, in the case where the transmittance at each wavelength within a wavelength band of 400 nm to 500 nm corresponding to the blue color region is reduced by a smaller margin than the transmittance at each wavelength within another wavelength band, the nanoparticle displays a blue-based color. In this case, when two electrochromic materials having a similar color are used, the absorption wavelength band is broadened, and the nanoparticle strongly displays a color to be implemented.

Meanwhile, the first electrochromic material is an inorganic material, and the inorganic material may be formed of at least one type of transition metal oxide. Specifically, the inorganic material may be formed of at least one of tungsten oxide, molybdenum oxide, tantalum oxide, niobium oxide, vanadium oxide, iron oxide, tin oxide, bismuth oxide, cerium oxide, manganese oxide, chromium oxide, cobalt oxide, rhodium oxide, iridium oxide, and nickel oxide.

Since the first electrochromic material constituting the core has high electric conductivity, the nanoparticle 100 according to the present invention may have a high electrochromic rate.

Meanwhile, the second electrochromic material may be formed of an organic material or an inorganic material. When the organic material is compared with the inorganic material, the chemical stability deteriorates, but the electrochromic rate is high. Accordingly, the second electrochromic material may be selected as any one of the organic material or the inorganic material according to the use of the nanoparticle according to the present invention.

For example, when the nanoparticle according to the present invention is used as a material for a transparent display light shielding plate, a high electrochromic rate is required for the material for a light shielding plate. In this case, the second electrochromic material may be an organic material.

For another example, when the nanoparticle according to the present invention is used as a material for a vehicle window coating, high chemical stability is required for the material for a window coating because a vehicle is frequently exposed to the external environment. In this case, the second electrochromic material may be an inorganic material.

Meanwhile, when the second electrochromic material is formed of an organic material, the second electrochromic material may be any one of compounds represented by the following Chemical Formulae 1 to 7.

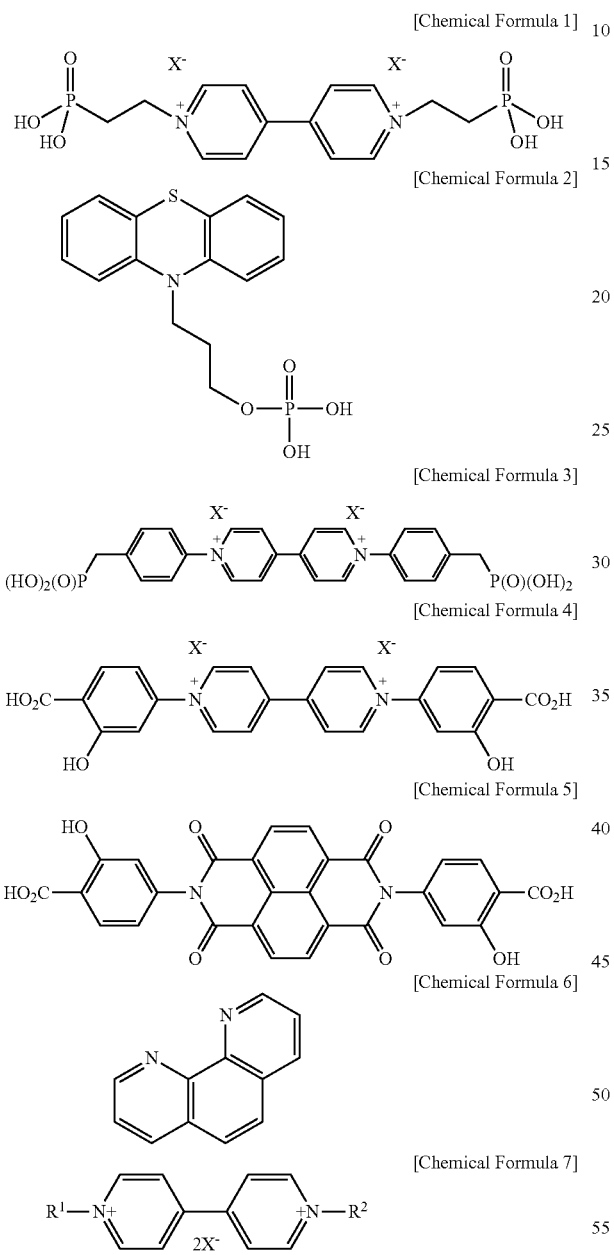

[Chemical Formula 1]

[Chemical Formula 2]

[Chemical Formula 3]

[Chemical Formula 4]

[Chemical Formula 5]

[Chemical Formula 6]

[Chemical Formula 7]

In Chemical Formulae 1 to 7, $X^-$ is any one of $BF_4^-$, $ClO_4^-$, $CF_3SO_3^-$, $F^-$, $Cl^-$, $Br^-$, and $I^-$, and In Chemical Formula 7, $R^1$ and $R^2$ are any one of a methyl group, an ethyl group, a propyl group, a butyl group, a pentyl group, a hexyl group, a heptyl group, an octyl group, an isopentyl group, and a benzyl group.

When a predetermined voltage is applied to the compounds represented by Chemical Formulae 1 to 7, the compounds are oxidized or reduced, and accordingly, the absorption spectra of the compounds are changed.

For example, when voltage is applied to the compound (hereinafter, 'viologen') represented by Chemical Formula 7, the viologen is oxidized, and has a structure such as the following Chemical Formula 8. Accordingly, the absorption spectra of the compounds are changed, and the colors of the compounds are changed.

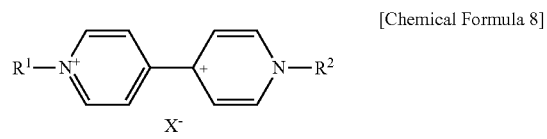

[Chemical Formula 8]

The viologen may include various substituents, and the color and the discoloration potential according to the type of substituent are the same as those in the following Table 1.

TABLE 1

| Substituent (R1, R2) | Color of Divalent Cation (MV2+) | Color of Radical Cation (MV+?) | Discoloration Potential (V)(vs SCE) |
|---|---|---|---|
| Methyl | colorless | blue | −0.688 |
| Ethyl | colorless | blue | −0.691 |
| Propyl | colorless | blue | −0.690 |
| Butyl | colorless | blue | −0.686 |
| Pentyl | colorless | purple | −0.686 |
| Hexyl | colorless | purple | −0.710 |
| Heptyl | colorless | mauve | −0.600 |
| Octyl | colorless | crimson | −0.705 |
| iso-Pentyl | colorless | purple | −0.696 |
| Benzyl | colorless | mauve | −0.573 |

Meanwhile, the organic material may be a polymer compound. Specifically, the polymer compound may be any one of polythiophene, poly(3-methylthiophene), polypyrrole, poly(3-methylketopyrrole), poly(3,4-dimethylpyrrole), poly(N-methylpyrrole), polyaniline, poly(2-methylaniline), and poly(3-methylaniline).

The following Table 2 shows electrochromic characteristics of a polymer compound which uses thiophene and thiophene derivatives as monomers.

TABLE 2

| Type of polymer | Absorption wavelength (nm) in oxidation state/Color | Absorption wavelength (nm) in reduction state/Color | Discoloration Potential (V)(vs SCE) |
|---|---|---|---|
| Polythiophene | 730/blue | 470/red | 1.1 |
| Poly(3-methylthiophene) | 750/deep-blue | 480/red | 0.75 |

The following Table 3 shows electrochromic characteristics of a polymer compound which uses pyrrole and pyrrole derivatives as monomers.

TABLE 3

| Type of polymer | Color in oxidation state | Color in reduction state | Discoloration Potential (V)(vs SCE) |
|---|---|---|---|
| Polypyrrole | brown | yellow | 0 to 0.7 |
| Poly(3-methylketopyrrole) | yellow-brown | brown-yellow | 0 to 1.1 |

TABLE 3-continued

| Type of polymer | Color in oxidation state | Color in reduction state | Discoloration Potential (V)(vs SCE) |
|---|---|---|---|
| Poly(3.4-dimethylpyrrole) | purple | green | −0.5 to 0.5 |
| Poly(N-methylpyrrole) | brown-red | orange-yellow | 0 to 0.8 |

The following Table 4 shows electrochromic characteristics of a polymer compound which uses aniline and aniline derivatives as monomers.

TABLE 4

| Type of polymer | −0.2 V absorption wavelength (nm) | 0.2 V absorption wavelength (nm) | 0.3 V absorption wavelength (nm) | 0.4 V absorption wavelength (nm) | −0.2 to 0.4 V response time (s) | 0.4 to −0.20 V response time (s) |
|---|---|---|---|---|---|---|
| Polyaniline | 320, 440 | 320, 440, >820 | 330, 430, 800 | 340, 420, 800 | 1.4 | 0.6 |
| Poly(2-methylaniline) | 308, 420 | 308, 420 | 312, 410, >820 | 380, 800 | 1.6 | 0.6 |
| Poly(3-methylaniline) | 304, 420 | 304, 420 | 304, 410, >820 | 306, 390, >820 | 3.2 | 1.0 |

Absorption spectra and discoloration potentials of the polymer compounds may vary depending on the molecular weight thereof without being limited to those in Tables 1 to 4.

Meanwhile, when the second electrochromic material is formed of an inorganic material, the second electrochromic material may be formed at least one type of transition metal oxide. Specifically, the second electrochromic material may be formed of at least one of tungsten oxide, molybdenum oxide, tantalum oxide, niobium oxide, vanadium oxide, iron oxide, tin oxide, bismuth oxide, cerium oxide, manganese oxide, chromium oxide, cobalt oxide, rhodium oxide, iridium oxide, and nickel oxide.

Here, the first electrochromic material and the second electrochromic material may be formed of different types of transition metal oxides.

As described above, the nanoparticle according to the present invention may have both high light-shielding properties and a high electrochromic rate, and may have various colors.

Figure 2:
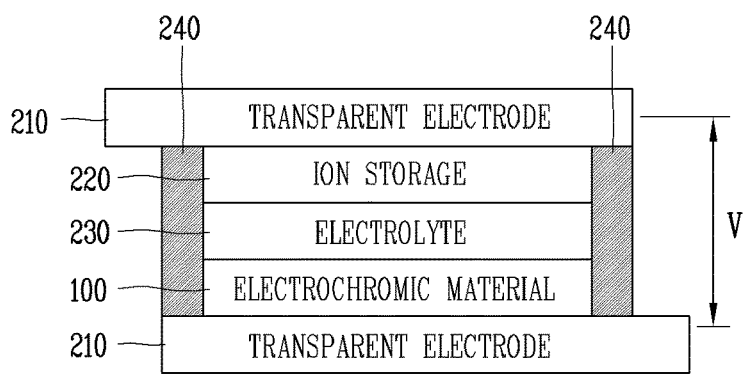
FIG. 2 is a conceptual view illustrating a structure of an electrochromic cell which utilizes the electrochromic nanoparticle according to the present invention.

Meanwhile, the nanoparticle according to the present invention may be utilized by the method illustrated in FIG. 2.

FIG. 2 is a conceptual view illustrating a structure of an electrochromic cell which utilizes the electrochromic nanoparticle according to the present invention.

As illustrated in FIG. 2, the electrochromic cell may be provided with a discoloration layer 100 formed of the nanoparticles according to the present invention. The discoloration layer 100 is a layer in which a color is actually changed in the electrochromic cell.

In addition, electrodes 210 for applying voltage to the discoloration layer 100 are disposed at both sides of the discoloration layer 100. When a voltage of a threshold or more is applied to the electrodes 210, the color of the discoloration layer 100 is changed while nanoparticles constituting the discoloration layer 100 are oxidized or reduced.

In this case, the electrochromic cell may further include an ion storage layer 220 for assisting the oxidation or reduction of the electrochromic material, an electrolyte layer 230, and a sealant layer 240. Here, the electrolyte layer 230 may be a liquid phase, a solid phase, or a gel phase, and the type of material which may be constituted is shown in the following Table 5.

TABLE 5

| Material | Type |
|---|---|
| $LiClO_4$ propylene carbonate(PC) mixed w/PMMA | polymer complex |
| amylopectin-rich starch (Amidex 4001), aqueous dispersion, mixed with glycerol or EG, addition of $LiClO_4$, and dispersed in Teflon plaque | polymer complex |
| complex PVA w/$H_3PO_4$, $H_2SO_4$, HCl | polymer complex |
| $LiClO_4$, gelatin (Oetker), glycerol, formaldehyde | polymer complex |

TABLE 5-continued

| Material | Type |
|---|---|
| (p(TMC)/PEO)(poly(trimethylene carbonate)/poly(ethylene oxide)) doping w/$LiClO_4$ | SPE |
| p(TMC) w/$LiClO_4$ & $LiBF_4$ | SPE |
| elastomer w/$LiClO_4$ | polymer complex |
| $LiClO_4$, $LiCF_3SO_3$, $LiN(CF_3SO_2)_2$polymer: PMMA, PEO, PVC, PANsolvent: PC, EC, γ-BL | polymer complex |
| PEO(polyethylene oxide) gel | polymer |
| LiPON (lithium phosphorous oxynitride) | inorganic |
| P(VDF-TrFE) polar polymer | polymer |
| $LiClO_4$ (d-U(2000)n$LiClO_4$, d-U(900)n$LiClO_4$)matrix: ormosils (organically modified silicates) from poly(oxyethylene) | polymer complex |
| LiF | inorganic |
| $Ta_2O_5$ | inorganic |
| $LixTaOy$ | inorganic |
| $LiClO_4$ in PC or PMMA + PC | polymer complex |
| PVA-$H_3PO_4$-PEG complex | polymer complex |
| $LiPO_4$ + $WO_3$ (2 wt %) composite (LPWON) | inorganic |
| CuCl2 (cooper(II) chloride) + animal protein + gelatine | polymer complex |
| mica film, lithium fluorhectorite film | |
| $LiClO_4$polymer: polypropylene carbonate, poly(epichlorohydrin-co-ethylene oxide) | polymer complex |
| $HSbO_3 2H_2O$ | inorganic |
| Li salt, LPEI(linear poly(ethylene imine), PEO(poly(ethylene oxide) | polymer complex |
| HCl + PEO, PEO + $LiClO_4$, PTS + urea + glycerol, PEO + PTS, PTS + glycerol +PEO | polymer complex |
| CSE (cellulose matrix solid electrolyte), NCC (nanocrystalline cellulose) | cellulose type |
| optimized BEMA/PEGMA, Li+ | polymer (gel) |
| HPC(hydroxypropyl cellulose) based, $CH_2Cl_2$ (dichloromethane), PEG, DBSA(4-dodecylbenzenesulfonic acid) | cellulose based-polymer (gel) |

Meanwhile, the sealant layer serves to maintain the sealing and the cell gap.

Meanwhile, the ion storage layer 220 is only a constituent element for assisting the oxidation or reduction of the electrochromic material, and is not an essential constituent element of the electrochromic cell.

Meanwhile, the nanoparticle according to the present invention may further include at least one layer between a core and a shell.

Figure 3:
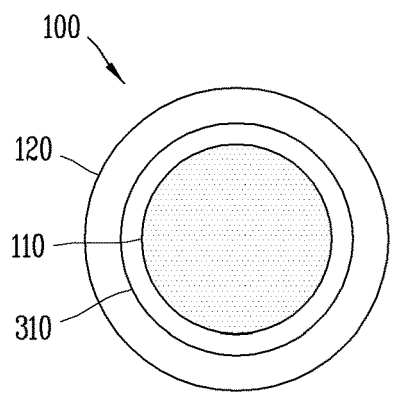
FIG. 3 is a conceptual view illustrating an electrochromic nanoparticle further including an adsorption layer between a core and a shell.

FIG. 3 is a conceptual view illustrating an electrochromic nanoparticle further including an adsorption layer between a core and a shell.

As in FIG. 3, the nanoparticle 100 according to the present invention may further include an adsorption layer 310 formed between a core 110 and a shell 120 so as to enhance adsorption force of the core and the shell. In an Example, the adsorption layer 310 may be formed of $TiO_2$. $TiO_2$ is a transition metal oxide, but has weak electrochromic characteristics. Accordingly, $TiO_2$ scarcely affects the absorption spectrum of the nanoparticle 100. However, $TiO_2$ serves to increase bonding force of the core 110 and the shell 120. Accordingly, the structural stability of the nanoparticle 100 according to the present invention is enhanced.

Hereinafter, the present invention will be described in more detail through the Examples and the Experimental Examples. However, the scope and content of the present invention are not interpreted to be curtailed or limited by the Examples and the Experimental Examples to be described below.

Experimental Example 1. Measurement of Transmittance of Nanoparticle in which Electrochromism Occurs Only at Shell in Core and Shell at Each Wavelength The transmittance of a nanoparticle in which a core was formed of titanium oxide and a shell was formed of the compound (hereinafter, phenanthroline) represented by Chemical Formula 6 was measured at each wavelength. In this case, the wavelength band measured was 400 nm to 800 nm.

Thereafter, voltage was applied to the nanoparticle, and the value of voltage applied was gradually increased. After the nanoparticle was discolored, the application of voltage was stopped, and the transmittance of the discolored nanoparticle was measured at each wavelength. In this case, the wavelength band measured was 400 nm to 800 nm.

Figure 4A:
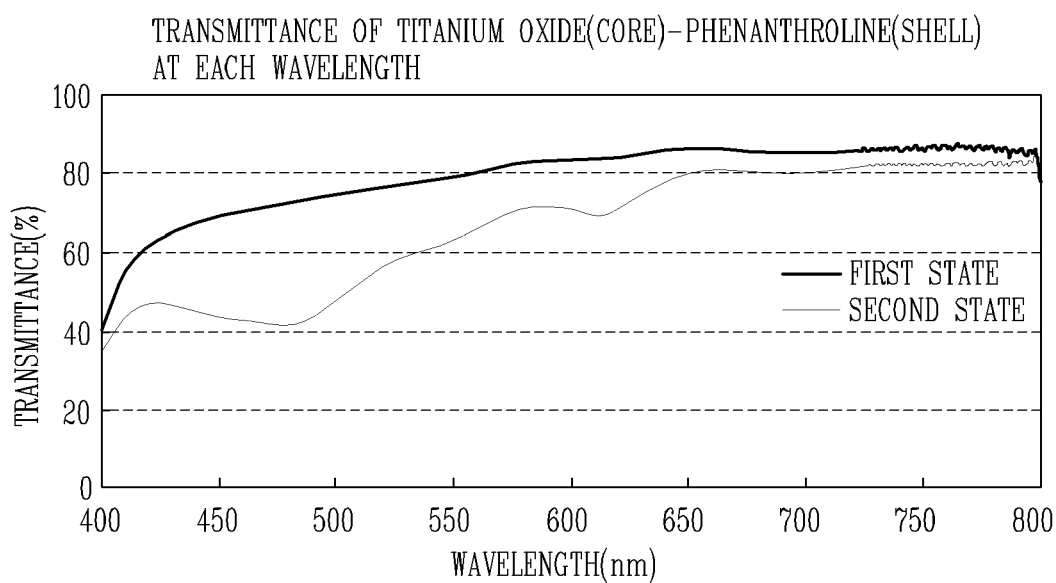
FIG. 4A is a graph showing the transmittance of the nanoparticle used in Experimental Example 1 at each wavelength.

FIG. 4A is a graph showing the transmittance of the nanoparticle used in Experimental Example 1 at each wavelength.

FIG. 4A includes two graphs (first and second states), and the first state and the second state show the transmittance of the nanoparticle before the discoloration and the transmittance of the nanoparticle after the discoloration, respectively. According to FIG. 4A, the transmittance within a wavelength band of about 420 nm to about 510 nm after the nanoparticle was discolored was decreased. The nanoparticle used in Experimental Example 1 displayed a red-based color after the discoloration.

Experimental Example 2. Measurement of Transmittance of Nanoparticle in which Core and Shell Display Complementary Colors at Each Wavelength The transmittance of a nanoparticle in which a core was formed of tungsten oxide and a shell was formed of phenanthroline was measured at each wavelength. In this case, the wavelength band measured was 400 nm to 800 nm.

Thereafter, voltage was applied to the nanoparticle, and the value of voltage applied was gradually increased. After the nanoparticle was discolored, the application of voltage was stopped, and the transmittance of the discolored nanoparticle was measured at each wavelength. In this case, the wavelength band measured was 400 nm to 800 nm.

Figure 4B:
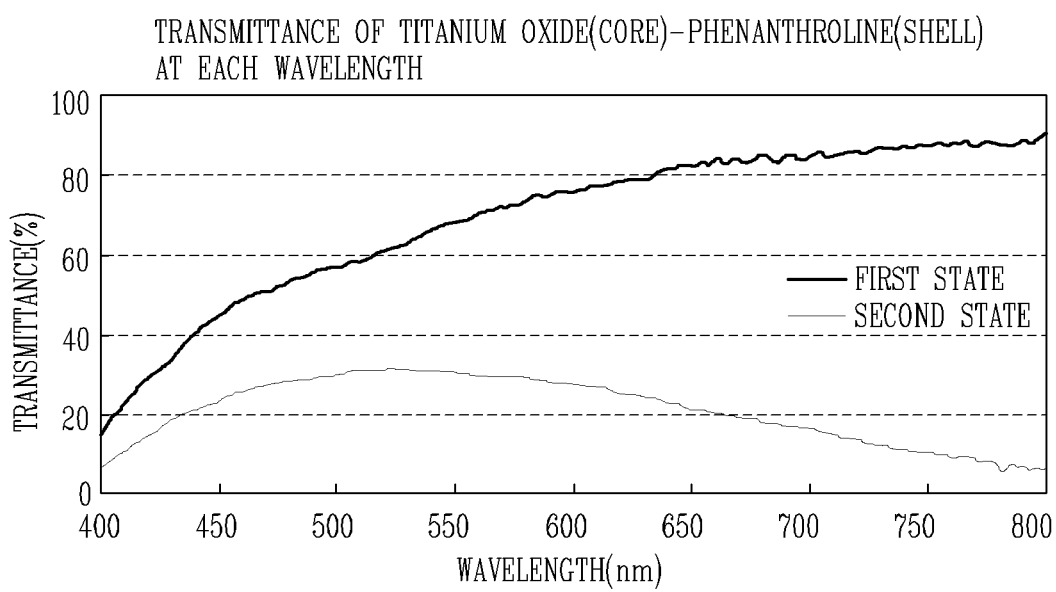
FIG. 4B is a graph showing the transmittance of the nanoparticle used in Experimental Example 2 at each wavelength.

FIG. 4B is a graph showing the transmittance of the nanoparticle used in Experimental Example 2 at each wavelength.

FIG. 4B includes two graphs (first and second states), and the first state and the second state show the transmittance of the nanoparticle before the discoloration and the transmittance of the nanoparticle after the discoloration, respectively. According to FIG. 4B, after the nanoparticle was discolored, the transmittances within all the wavelength bands were rapidly decreased.

Specifically, as the nanoparticle is converted from the first state to the second state, the transmittance at each wavelength within a wavelength band of 400 nm to 800 nm was decreased to 0.06 to 0.6 times. Further, as the nanoparticle at a wavelength with a high transmittance was converted from the first state to the second state, the transmittance was decreased by a large margin.

In addition, as the nanoparticle is converted from the first state to the second state, all the transmittances within a wavelength band of 400 nm to 800 nm were decreased to 30% or less. Accordingly, the nanoparticle used in Experimental Example 2 displayed a black-based color after the discoloration.

The nanoparticles in Experimental Example 1 and Experimental Example 2 had the same constituent component of the shell, but it could be confirmed that the light transmittance (second mode) in Experimental Example 2 was much lower than the light transmittance (second mode) in Experimental Example 1.

Experimental Example 3. Measurement of Transmittance of Nanoparticle in which Core and Shell Display Similar Colors at Each Wavelength The transmittance of a nanoparticle in which a core was formed of tungsten oxide and a shell was formed of viologen was measured at each wavelength. In this case, the wavelength band measured was 400 nm to 800 nm.

Thereafter, voltage was applied to the nanoparticle, and the value of voltage applied was gradually increased. After the nanoparticle was discolored, the application of voltage was stopped, and the transmittance of the discolored nanoparticle was measured at each wavelength. In this case, the wavelength band measured was 400 nm to 800 nm.

Figure 4C:
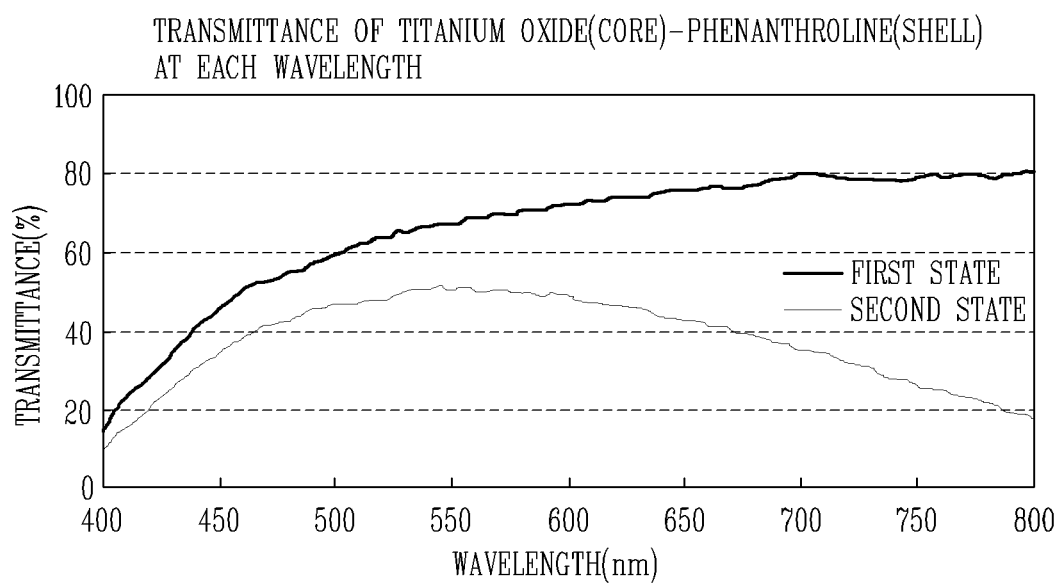
FIG. 4C is a graph showing the transmittance of the nanoparticle used in Experimental Example 3 at each wavelength.

FIG. 4C is a graph showing the transmittance of the nanoparticle used in Experimental Example 3 at each wavelength.

FIG. 4C includes two graphs (first and second states), and the first state and the second state show the transmittance of the nanoparticle before the discoloration and the transmittance of the nanoparticle after the discoloration, respectively. According to FIG. 4C, after the nanoparticle was discolored, the transmittance at a wavelength of about 600 nm to about 800 nm was rapidly decreased.

Specifically, as the nanoparticle was converted from the first state to the second state, the light transmittance at each wavelength within a wavelength band of 400 nm to 500 nm was decreased to 0.65 times to 0.80 times, and the light transmittance at each wavelength within a wavelength band of 500 nm to 800 nm was decreased to 0.20 times to 0.80 times.

Further, as the nanoparticle was converted from the first state to the second state, the light transmittance at each wavelength within a wavelength band of 400 nm to 500 nm was changed from 15% to 60% to 10% to 50%, and the light transmittance at each wavelength within a wavelength band of 500 nm to 800 nm was changed from 60% to 80% to 17% to 50%.

That is, the light transmittance at each wavelength within a wavelength band of 500 nm to 800 nm was decreased by a larger margin than that within a wavelength band of 400 nm to 500 nm. The nanoparticle used in Experimental Example 3 displayed a blue-based color after the discoloration.

It is obvious to the person skilled in the art that the present invention can be embodied in other specific forms without departing from the spirit and essential characteristics of the present invention.

Further, the aforementioned detailed description should not be interpreted as limitative in all aspects, and should be considered as illustrative. The scope of the present invention should be defined by the reasonable interpretation of the accompanying claims, and all the modifications within the equivalent scope of the present invention are included in the scope of the present invention.

The invention claimed is:

1. An electrochromic nanoparticle comprising:
   a core formed of a first electrochromic material;
   a shell encompassing the core and formed of a second electrochromic material; and
   an adsorption layer positioned between the core and the shell and formed so as to enhance adsorption force of the core and the shell, the adsorption layer having a thickness less than a thickness of the core,
   wherein the first electrochromic material is formed of at least one transition metal oxide, and
   wherein the absorption layer is formed of $TiO_2$.

2. The electrochromic nanoparticle of claim 1, wherein when a voltage equal to or more than a reference value is applied to the nanoparticle, the nanoparticle is converted from a first state to a second state, and when a reverse voltage equal to or more than the reference value is applied to the nanoparticle in the second state, the nanoparticle is converted from the second state to the first state, and the nanoparticle has different light transmittances in the first and second states.

3. The electrochromic nanoparticle of claim 2, wherein when the nanoparticle is converted from the first state to the second state, the light transmittance at each wavelength within a wavelength band of 400 nm to 800 nm is decreased to 0.06 times to 0.6 times.

4. The electrochromic nanoparticle of claim 3, wherein the light transmittance of the nanoparticle in the first state at each wavelength within a wavelength band of 400 nm to 800 nm is 15% to 90%, and the light transmittance of the nanoparticle in the second state at each wavelength within a wavelength band of 400 nm to 800 nm is 5% to 30%.

5. The electrochromic nanoparticle of claim 2, wherein when the nanoparticle is converted from the first state to the second state, the light transmittance at each wavelength within a wavelength band of 400 nm to 500 nm is decreased to 0.65 times to 0.80 times, and the light transmittance at each wavelength within a wavelength band of 500 nm to 800 nm is decreased to 0.20 times to 0.80 times.

6. The electrochromic nanoparticle of claim 5, wherein the light transmittance of the nanoparticle in the first state at each wavelength is 15% to 60% within a wavelength band of 400 nm to 500 nm and 60% to 80% within a wavelength band of 500 nm to 800 nm, and the light transmittance of the nanoparticle in the second state at each wavelength is 10% to 50% within a wavelength band of 400 nm to 500 nm and 17% to 50% within a wavelength band of 500 nm to 800 nm.

7. The electrochromic nanoparticle of claim 1, wherein the first electrochromic material is formed of at least one of tungsten oxide, molybdenum oxide, tantalum oxide, niobium oxide, vanadium oxide, iron oxide, manganese oxide, chromium oxide, cobalt oxide, rhodium oxide, iridium oxide, and nickel oxide.

8. The electrochromic nanoparticle of claim 1, wherein the second electrochromic material is any one of compounds represented by the following Chemical Formula 1 to 7,

[Chemical Formula 1]

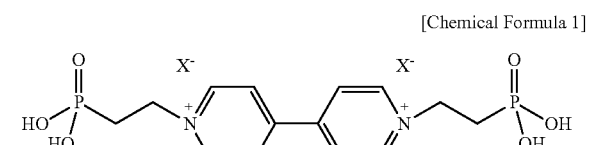

[Chemical Formula 2]

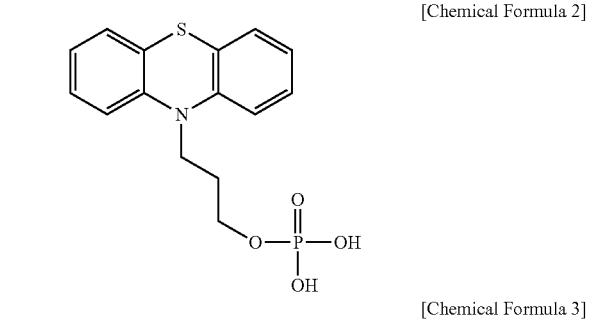

[Chemical Formula 3]

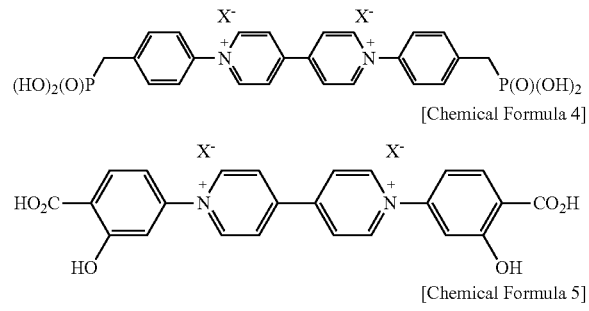

[Chemical Formula 4]

[Chemical Formula 5]

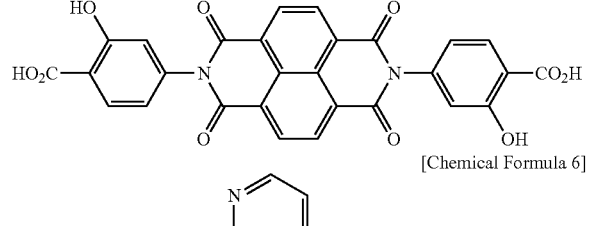

[Chemical Formula 6]

[Chemical Formula 7]

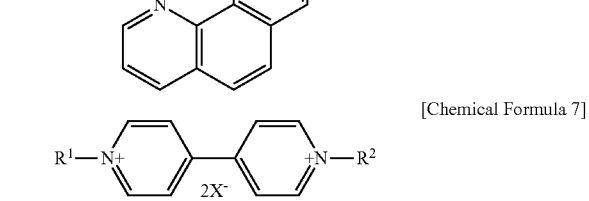

in Chemical Formula 1 to 7, $X^-$ is any one of $BF_4^-$, $ClO_4^-$, $CF_3SO_3^-$, $F^-$, $Cl^-$, $Br^-$, and $I^-$, and in Chemical Formula 7, $R^1$ and $R^2$ are any one of a methyl group, an ethyl group, a propyl group, a butyl group, a pentyl group, a hexyl group, a heptyl group, an octyl group, an isopentyl group, and a benzyl group.

9. The electrochromic nanoparticle of claim 1, wherein the second electrochromic material is any one of polythiophene, poly(3-methylthiophene), polypyrrole, poly(3-methylketopyrrole), poly(3,4-dimethylpyrrole), poly(N-methylpyrrole), polyaniline, poly(2-methylaniline), and poly(3-methylaniline).

10. The electrochromic nanoparticle of claim 1, wherein the second electrochromic material is formed of at least one transition metal oxide, and the first electrochromic material and the second electrochromic material are formed of different transition metal oxides.

11. The electrochromic nanoparticle of claim 1, wherein the transition metal oxide of the first electrochromic material of the core is different from the $TiO_2$ of the adsorption layer, and wherein the $TiO_2$ of the adsorption layer has a weak electrochromic characteristic and does not affect an adsorption spectrum of the electrochromic nanoparticle.

* * * * *